Patented Nov. 24, 1936

2,062,037

UNITED STATES PATENT OFFICE 2,062,037

VOLTAGE REGULATOR

Wilcox P. Overbeck, Cambridge, Mass., assignor to Raytheon Manufacturing Company, Newton, Mass., a corporation of Delaware Application November 23, 1934, Serial No. 754,468

8 Claims. (Cl. 175—363)

This invention relates to voltage regulators, and more particularly to voltage regulators which are designed to deliver a voltage to a rectifier which increases in value as the load delivered by the rectifier increases.

An object of my invention is to produce such a voltage regulator which has a substantially linear rising characteristic from no load to full load, so that the voltage at the load is maintained substantially constant.

Another object of my invention is to devise such a regulator in which the amount of material for securing the desired characteristic shall be a minimum.

A still further object of my invention is to provide such a voltage regulator in which the no load and full load values of the voltage supplied thereby can be independently adjusted.

The foregoing and other objects of my invention will be best understood from the following description of an exemplification thereof, reference being had to the drawings, wherein.

In a system for supplying direct current to a load from an alternating current source by means of a rectifier, various voltage drops occur throughout the elements of such a system. For example, a variable drop occurs between the input and output of many rectifiers. Also a resistance drop occurs in various coils associated with such a system, and if a filter is used, an additional drop occurs in the filter circuit. If a constant voltage were supplied to such a rectifier system, the voltage at the load would fall as the load increased. Therefore it is desirable to devise some system whereby as the load increases, the voltage supplied to the rectifier will increase sufficiently to compensate for the various voltage drops occurring through the system. Thus the voltage at the load would be maintained substantially constant.

Figure 1:
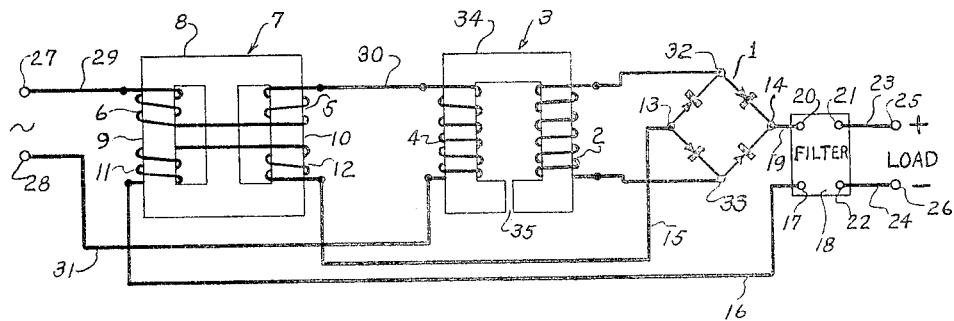
Fig. 1 is a diagrammatic representation of one form of my novel voltage regulator.

My invention involves a novel voltage regulator system of this type in which the voltage delivered by a transformer to the rectifier is increased in response to an increase in load by having the direct current load control the saturation of an inductance in series with the primary of the transformer. As shown in Fig. 1, this system consists of a rectifier 1 fed from a secondary winding 2 of a transformer 3, whose primary winding 4 has in series therewith inductance coils 5 and 6 of a controlling choke 7. The rectifier 1 is illustrated diagrammatically as being a full-wave rectifying bridge. Any other rectifying arrangement could be used, such as, for example, a full-wave rectifying tube or tubes, or even a single wave rectifier. The choke 7 consists preferably of a three-legged core 8 having the coils 5 and 6 wound on the outer two legs 9 and 10 thereof. Two additional coils 11 and 12 are also wound on the legs 9 and 10, and connected in series with each other. The coils 5, 6, 11 and 12 are so related that any alternating current induced in coil 11 is neutralized by a substantially equal and opposite alternating voltage induced in coil 12. The rectifier 1 has two output terminals 13 and 14. One of the output terminals, for example 13, is connected by a conductor 15 through the coils 12 and 11, and then by an additional conductor 16 to input terminal 17 of a filter 18. The other output terminal 14 of the rectifier 1 is connected by a conductor 19 to the other input terminal 20 of filter 18. The two output terminals 21 and 22 of filter 18 are connected by conductors 23 and 24 to the load terminals 25 and 26, respectively. The system may be provided with two input terminals 27 and 28 which are adapted to be connected to some suitable source of alternating current. One of the input terminals, for example terminal 27, is connected by means of a conductor 29 to the coils 5 and 6 in series, and then by an additional conductor 30 to one end of the primary winding 4 of transformer 3. The other end of said primary winding 4 is connected by means of the conductor 31 to the other input terminal 28. Instead of coils 5 and 6 being in series, it is sometimes desirable to connect these coils in parallel with each other. The terminals of the secondary winding 2 of the transformer 3 are connected to the two input terminals 32 and 33 of the rectifier 1. The transformer 3 is provided with a special core member 34 having an air gap 35 which is designed to control the operation of the system, as will be explained below. In some cases, where the action of a filter is not necessary, the filter may be omitted. Also the coils 11 and 12 might be connected after instead of before the filter or in an intermediate section of the filter.

When an alternating voltage is applied to the input terminals 27 and 28 and a direct current load is drawn from the load terminals, current will flow through the various coils shown. The current so flowing will introduce voltage drops in these coils, and also will introduce voltage drops in the rectifier 1 and in the filter 18 associated therewith. By passing the load current through the coils 11 and 12, this load current will tend to saturate the core 8, and thus reduce the reactance of coils 5 and 6. This reduction in inductance of these coils will decrease the voltage drop introduced by these coils, and will permit a larger portion of the impressed voltage to be impressed upon the primary 4. This causes the voltage across the secondary 2, which voltage is impressed upon the rectifier 1, to increase with an increase in the load. By properly designing the various constants of the system, this increase in voltage can be made to compensate for the additional voltage drops due to the increase in current through the system.

Figure 2:
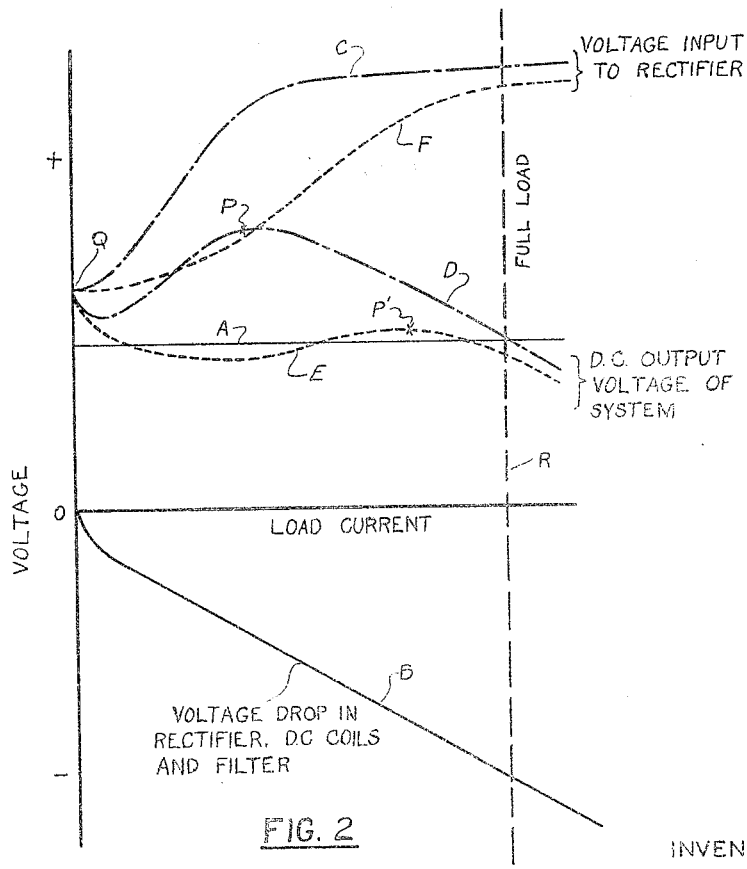
Fig. 2 is a set of curves explaining the operation of the arrangement shown in Fig. 1.

Various systems have heretofore been devised which attempt to utilize the principle of saturating a choke in series with the transformer feeding a rectifier for the purpose of securing a rising voltage applied to said rectifier. However, severe difficulties have arisen in securing the proper characteristic curve for such a system. When the various parts of my system, as shown in Fig. 1, are properly designed in accordance with the principles as hereinafter set forth, a substantially ideal characteristic curve can be secured. The difficulties can better be appreciated by referring to Fig. 2 in which typical characteristic curves of systems of this kind are illustrated. The vertical axis in Fig. 2 represents voltage, values of voltages impressed on various parts of the system being represented as positive values and voltage drops as negative values. The horizontal axis represents values of load current. The full load of a voltage-rectifying system of the kind shown may be represented by line R. Curve A in Fig. 2 represents an ideal output characteristic curve in which the various voltage drops occurring in the different parts of the system are compensated for so that the output voltage or voltage across the load remains constant. The output voltage of the system can be considered as being the voltage input to the rectifier 1 less the total voltage drop occurring in the rectifier 1, D. C. coils 11 and 12, and filter 18. This total voltage drop is indicated on curve B. If an ordinary transformer having a laminated iron core with a continuous magnetic path of economical size were used in such a system, the curve of input voltage to the rectifier represented by curve C would most likely be obtained. Upon subtracting curve B from curve C, the output characteristic curve D would result. It will be noted that the voltage rises rapidly to a peak at point P, after which it falls off again and a fairly wide range of voltage variation occurs from no load to full load. The prior art has had extreme difficulty in regulating the height and position of peak P. It will be seen that if the height of peak P could be lowered and shifted so that it occurs nearer the full load rating of the system, a resultant curve, such as that represented by E which approximates the ideal curve A, might be obtained. If a system is constructed in accordance with my invention, the voltage input to the rectifier can be represented by curve F. When the curve B is subtracted from the curve F, the output characteristic curve E results. As indicated, curve E approximates the ideal curve A. An arrangement constructed in accordance with my invention gives a curve such as E, which approximates substantially the ideal curve A.

Figure 3:
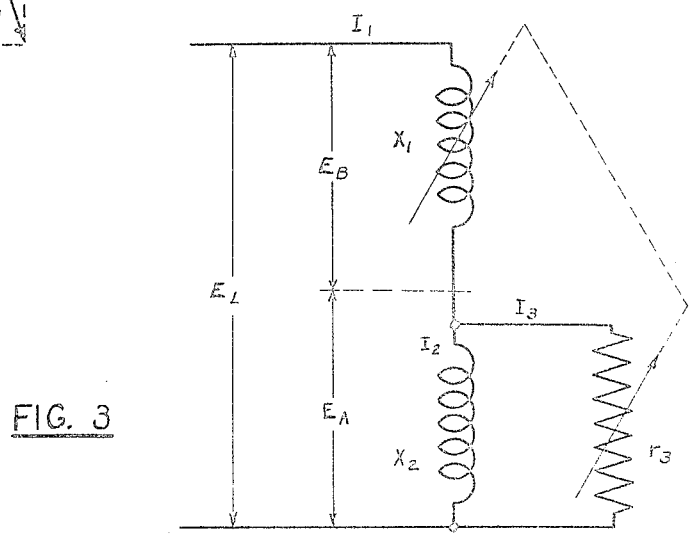
Fig. 3 is an equivalent circuit of the arrangement shown in Fig. 1.

In order to explain the principles of my invention, I have schematically represented in Fig. 3 substantially the equivalent circuit of the arrangement as shown in Fig. 1. The reactance of coils 5 and 6 is represented by $X_1$. The effective reactance of the transformer 3 referred to the primary circuit thereof is represented by $X_2$. The effective resistance of the transformer and load referred to the primary circuit is represented by the resistance $r_3$. Since $r_3$ varies with the load and since $X_1$ also varies with the load, both $r_3$ and $X_1$ are variable, and there is some functional relationship between these two values. This fact has been illustrated diagrammatically by the dotted lines connecting these two elements. The symbols $E_L$, $E_A$, and $E_B$ represent the voltages appearing across the various parts of the system. The symbols $I_1$, $I_2$, and $I_3$ represent the currents flowing through the various parts of the system. The operation of the equivalent circuit, as shown in Fig. 3, is analyzed vectorially in Fig. 4. The vector $E_L$ represents the voltage applied to the system. At no load $r_3$ is substantially zero, and the system therefore resolves itself into the two reactances $X_1$ and $X_2$ in series with $E_L$. I have represented the no load currents as $$I_2^0 \text{ and } I_1^0$$

the current through the reactances $X_2$ and $X_1$, respectively. These two currents are equal, and are represented by the vector $$I_2^0 \text{ and } I_1^0$$

at right angles to the vector $E_L$. This right-angled relationship occurs because the entire load is inductive. The voltage drops produced in $X_1$ and $X_2$ are at right angles to said current, and are therefore in phase with the line voltage $E_L$. I have represented these voltage drops by vectors $$I_2^0 X_2^0 \text{ and } I_1^0 X_1^0$$

It will be seen that the sum of these two vectorial quantities is equal to the line voltage $E_L$. The vector $$I_2^0 X_2^0$$

is also equal to the no load voltage across the transformer, namely $$E_A^0$$

Under these conditions it will be seen that the applied voltage $E_L$ is divided between the two reactances $X_1$ and $X_2$ in proportion to the relative values of said two reactances. Thus if reactance $X_1$ is increased with respect to the reactance $X_2$, the voltage drop across $X_1$ will increase, and therefore the no load voltage $E_A^0$ will decrease. Likewise if reactance $X_1$ decreases with respect to $X_2$, the voltage drop across $X_1$ will decrease, and therefore the no load voltage $E_A$ will increase. Thus it will be seen that by varying the amount of the reactance $X_1$, the no load value of the voltage across the transformer can be regulated. Inasmuch as in the arrangement as shown in Fig. 1, the windings of transformer 3 had a separate magnetic path from the magnetic path of coils 5 and 6, a variation in the inductance of the coils 5 and 6 can be produced without affecting the inductance of the transformer. I have therefore provided an arrangement whereby an individual control of the no load voltage of my system may be secured by a variation of the inductances of coils 5 and 6 of the choke 7. It will further be seen that for proper design the voltage drop across the reactance $X_1$ at no load should be a relatively large proportion of the applied voltage $E_L$, so as to permit the subsequent increase of the voltage $E_A$ when the reactance $X_1$ is decreased as a result of saturating the core 8 by the D. C. load coils 11 and 12. In order that the reactance $X_1$ be sufficiently large with respect to the reactance $X_2$ with a reasonable amount of material, it is desirable to make the reactance of the transformer relatively low. A closed core transformer at no load has a relatively high reactance. One way of decreasing this reactance is to increase the length of the magnetic path through the core. However, such a procedure would unduly increase the amount of core material, and therefore produce an excessive increase in the weight of the transformer. Other similar methods of decreasing the reactance of the transformer likewise produce an undesirable increase in the weight of the material used. I have found that simply by introducing the air gap 35 into the core of transformer 3, the desired decrease in the reactance of the transformer can be produced with a minimum amount of material.

Figure 4:
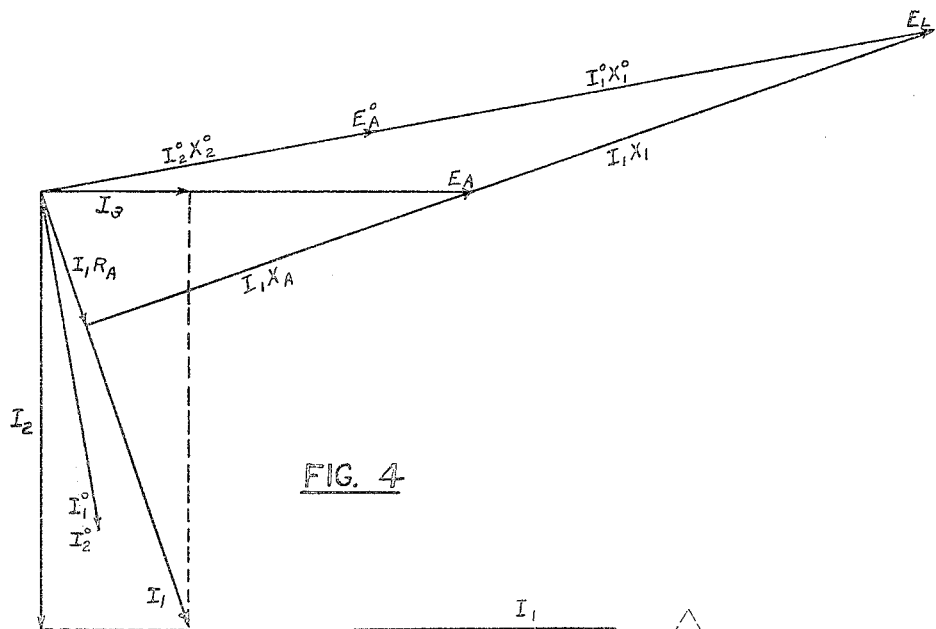
Fig. 4 is a vector diagram showing the relationships between the various vector components of my novel system.

As a load is put on the system, the load current passing through the coils 11 and 12 will tend to saturate the core 8, and thus decrease the value of the reactance $X_1$. The load on the system can be represented by the resistance $r_3$, and the presence of this resistance across the reactance $X_2$ also decreases the resultant impedance of the transformer circuit. Since the voltage $E_L$ will distribute itself in accordance with the relative values of the reactance $X_1$ and the impedance of the transformer, it is necessary that the impedance $X_1$ decrease at a more rapid rate than does the resultant impedance of the transformer. If this did not occur, instead of obtaining a rising characteristic for the system, a falling characteristic would be produced. Difficulty in causing the proper relative rate of change of the reactance $X_1$ and the impedance of the transformer has produced in previous devices the falling characteristic beyond the points P, as illustrated by curve B in Fig. 2. When, however, a system is constructed in accordance with my invention, the action as illustrated in Fig. 4 takes place. Thus, for example, at some load which may be full load, the voltage $E_A$ across the transformer may be represented by the vector as shown. Assuming that the load is substantially a resistance load, the load current can be represented by the vector $I_3$ in phase with the voltage $E_A$. Inasmuch as the voltage $E_A$ will have increased over the no load voltage $$E_A^0$$

due to the rising characteristic of the system, the magnetizing current $I_2$ will have increased over the value of the no load current $$I_2^0$$

This magnetizing current $I_2$ will be 90 degrees out of phase with the voltage $E_A$. The current $I_1$ will be the vectorial sum of $I_2$ and $I_3$. The voltage drop, due to the equivalent resistance of the parallel circuit $X_2$—$r_3$, can be represented by the vector $I_1 R_A$ in phase with the resultant current $I_1$. The voltage drop, due to the equivalent reactance of said parallel circuit, may be represented by the vector $I_1 X_A$ at right angles to $I_1 R_A$. The vectorial sum of these two voltages is the voltage $E_A$ appearing across the transformer. Since the current $I_1$ also flows through the reactance $X_1$, the reactive voltage drop $I_1 X_1$ will be in phase with the reactive voltage drop $I_1 X_A$. The total impressed voltage $E_L$ is therefore the vectorial sum of the three voltages $I_1 R_A$, $I_1 X_A$ and $I_1 X_1$. Since the value of $X_1$ has decreased, due to the saturating effect of coils 11 and 12, in spite of the fact that the resultant current through the system has increased, the voltage drop through the reactance $X_1$ will have decreased. Thus the voltage $E_A$ will have increased over the no load voltage $$E_A^0$$

thus giving to the system the desired rising characteristic. As stated above, in order to secure this rise in the voltage $E_A$, the value of $X_1$ should decrease faster than the equivalent impedance of the parallel circuit $X_2$—$r_3$. By making the value of $X_2$ small with respect to the values of $r_3$ for which the system is designed, changes in $r_3$ will produce a relatively small change in the equivalent impedance of said parallel circuit. Thus the reactance $X_1$ can be designed to vary at a much lower rate with respect to changes in load than if the reactance $X_2$ were designed with a high value. This lower rate of change of $X_1$ permits the choke 7 to be constructed with a much smaller amount of material. As has been indicated, the low value of $X_2$ can be readily produced by the provision of air gap 28. I have found that if $X_2$ is so designed as to draw a current $I_2$, which at full load is about three times the current $I_3$, a very satisfactory operation is obtained. This means that the reactance $X_2$ should preferably be a third of $r_3$ at full load. This value is simply an example of one design of my system, and $X_2$ may have various other values as long as the principles of the invention as described are adhered to. However for economical design, I have found that the reactance $X_2$ should be less than the impedance $r_3$ at full load.

The provision of the air gap 35 in the core 34 also greatly increases the effectiveness of the regulation of the reactance $X_1$. As will be seen from Fig. 4, the more nearly $E_A$ and $I_1 X_1$ are in phase with each other, the more directly does $I_1 X_1$ subtract itself from the applied voltage $E_L$, and therefore the more direct is the effect of said voltage drop on the resultant voltage $E_A$ impressed upon the transformer. An inspection of Fig. 4 will show that the larger the magnetizing current $I_2$ through the transformer is with relation to the load current $I_3$, the more nearly will the voltages $E_A$, $I_1 X_1$ and $E_L$ be in phase with each other and the more effective will be the control of the voltage $E_A$ by the voltage drop $I_1 X_1$. The air gap 35 in the core 34 increases the value of the magnetizing current inasmuch as it increases the reluctance of the magnetic path through the coil 4. Therefore, by the provision of such an air gap, the effectiveness of the choke 7 is increased. In absence of such an increase in magnetizing current, a much larger variation in the reactance of the choke 7 would have to be produced in order to produce the same regulation of the voltage across the transformer as is secured by my present arrangement.

I have found that the height of the peak P of curve D on Fig. 2 can be regulated substantially solely by the introduction of variation in the air gap 35. Also the location of this peak can be shifted to the right or the left by control of said air gap. Therefore, merely by adjusting the size of the air gap 35, the peak P can be shifted so that it occurs nearer the full load rating of the system, and its level can be reduced so that the desired value of voltage at full load can be secured.

Thus it will be seen that in the system which I have illustrated, control of the reactance of the coils 5 and 6 will control the no load voltage to the desired value, such as Q, and adjustment of the air gap 28 will shift the peak P over to a point, such as P'. Therefore, in my system, by a comparatively simple control of the elements shown therein, the substantially ideal curve E can be secured.

The provision of the air gap 35 provides both the ideal operation of the system which I have described above, and also a great saving in the weight of materials which are used. I have found that if a system without an air gap 35 were designed to give a certain characteristic, the same characteristic could be obtained with a system containing such an air gap with about 25 per cent. less total weight of material used. The system having the air gap and the lower weight would have substantially the same rating as the system without the air gap and the increased weight. Not only would this benefit be produced, but the resultant characteristic of the system would be more nearly ideal with the air gap than without said air gap. By utilizing the principles of my invention as herein described, I have been able to construct voltage regulating systems having a voltage variation of plus or minus three per cent. from one-sixth load to full load.

Of course it is to be understood that this invention is not limited to the particular details of the arrangement as described above as many equivalents will suggest themselves to those skilled in the art. For example, the arrangement may be utilized in a system in which an alternating current load is taken therefrom instead of a direct current load. In this case the reactance of choke 7 would be varied in accordance with the load current, as for example by rectifying a small part of the load current in using it to saturate the choke. Various other changes will likewise suggest themselves. It is accordingly desired that the appended claims be given a broad interpretation commensurate with the scope of the invention within the art.

What I claim is:

1. A voltage regulating system comprising two inductances in series with each other and adapted to be connected to a source of alternating current, a load circuit connected across one of said inductances, means for varying the magnitude of the other of said inductances inversely with the magnitude of the current flowing in said load circuit, the resultant reactance which said first-named inductance at full load places in parallel with said load circuit being less than the resultant impedance of said load circuit at full load when said reactance and impedance are referred to an equivalent parallel circuit.

2. A voltage regulating system comprising two inductances in series with each other and adapted to be connected to a source of alternating current, a load circuit connected across one of said inductances, means for varying the magnitude of the other of said inductances inversely with the magnitude of the current flowing in said load circuit, the resultant reactance of said first-named inductance at full load being about one-third of the resultant impedance of said load circuit at full load when said reactance and impedance are referred to an equivalent parallel circuit.

3. A voltage regulating system comprising two inductances in series with each other and adapted to be connected to a source of alternating current, a load circuit connected across one of said inductances, which comprises a winding on a magnetic core, said magnetic core having an air gap therein, the other of said inductances comprising a winding on a magnetic core, and a saturating winding on said last-named core, said saturating winding being energized in accordance with the magnitude of the current in said load circuit.

4. A voltage regulating system comprising a rectifier adapted to be connected between a source of alternating current and a direct current circuit, a transformer having a primary circuit adapted to be energized from said alternating current source, and a secondary circuit connected to said rectifier, an inductance in series with said primary circuit, and means for varying the magnitude of said inductance inversely with the magnitude of the current flowing in said direct current circuit, the resultant reactance of said transformer, referred to the primary circuit of said transformer, at full load which said transformer places in parallel with the circuit connected to the secondary circuit being less than the effective impedance of the total circuit connected to said secondary circuit at full load referred to the primary circuit of said transformer.

5. A voltage regulating system comprising a rectifier adapted to be connected between a source of alternating current and a direct current circuit, a transformer having a primary circuit adapted to be energized from said alternating current source, and a secondary circuit connected to said rectifier, an inductance in series with said primary circuit, and means for varying the magnitude of said inductance inversely with the magnitude of the current flowing in said direct current circuit, the resultant reactance of said transformer, referred to the primary circuit of said transformer, at full load being about one-third of the effective impedance of the total circuit connected to said secondary circuit at full load referred to the primary circuit of said transformer.

6. A voltage regulating system comprising a rectifier adapted to be connected between a source of alternating current and a direct current circuit, a transformer having a primary circuit adapted to be energized from said alternating current source, and a secondary circuit connected to said rectifier, an inductance in series with said primary circuit, said direct current circuit being adapted to be connected to a load circuit, and means for varying the magnitude of said inductance inversely with the magnitude of the current flowing in said load circuit, the resultant reactance of said transformer, referred to the primary circuit of said transformer, at full load which said transformer places in parallel with the circuit connected to the secondary circuit being less than the effective impedance of the total circuit connected to said secondary circuit at full load referred to the primary circuit of said transformer.

7. A voltage regulating system comprising a rectifier adapted to be connected between a source of alternating current and a direct current circuit, a transformer having a primary circuit adapted to be energized from said alternating current source, and a secondary circuit connected to said rectifier, an inductance in series with said primary circuit, and means for varying the magnitude of said inductance inversely with the magnitude of the current flowing in said direct current circuit, said transformer comprising said primary and secondary circuits wound on a magnetic core, said magnetic core having an air gap therein.

8. A voltage regulating system comprising a rectifier adapted to be connected between a source of alternating current and a direct current circuit, a transformer having a primary circuit adapted to be energized from said alternating current source, and a secondary circuit connected to said rectifier, an inductance in series with said primary circuit, said inductance comprising a winding on a magnetic core, and a saturating winding on said core, said saturating winding being energized in accordance with the magnitude of the current in said direct current circuit, said transformer comprising said primary and secondary circuits wound on a magnetic core, said magnetic core having an air gap therein.

WILCOX P. OVERBECK.